T. W. S. HUTCHINS.
MUFFLE FURNACE.
APPLICATION FILED OCT. 15, 1918.

1,325,674.

Patented Dec. 23, 1919.
2 SHEETS—SHEET 1.

INVENTOR
T. W. S. Hutchins
BY H. R. Kerslake
ATTORNEY

T. W. S. HUTCHINS.
MUFFLE FURNACE.
APPLICATION FILED OCT. 15, 1918.

1,325,674.

Patented Dec. 23, 1919.
2 SHEETS—SHEET 2.

INVENTOR
T. W. S. Hutchins
BY H. R. Kerslake
ATTORNEY

UNITED STATES PATENT OFFICE.

THOMAS WILLIAM STAINER HUTCHINS, OF MIDDLEWICH, ENGLAND.

MUFFLE-FURNACE.

1,325,674.     Specification of Letters Patent.     Patented Dec. 23, 1919.

Application filed October 15, 1918. Serial No. 258,242.

*To all whom it may concern:*

Be it known that I, THOMAS WILLIAM STAINER HUTCHINS, of Electro Bleach and By-Products Limited, Middlewich, in the county of Chester, England, a subject of the King of Great Britain and Ireland, have invented certain new and useful Improvements Relating to Muffle-Furnaces, of which the following is a specification.

This invention relates to muffle furnaces of the type in which a gradual increase and gradual reduction in temperature is effected for the drying and heat treatment, for example, of carbon blocks for use in the metallurgical, chemical and electrical industries.

The object of the invention is to provide an improved form and arrangement of the furnace with its gas producer, which shall be very effective in use, economical to construct and occupy a minimum floor space.

The invention comprises a furnace of circular or approximately circular form, with a gas producer located at the center of the furnace and with a series of separate chambers, each containing a muffle, around said producer, means being provided for the connection of the chambers with each other, with the producer and with air inlets, so that each chamber in turn serves as the combustion area and as a regenerative area by its connection with the flue for the outflow of hot gases from the combustion area, or with the air supply to that area.

Referring to the accompanying sheet of explanatory drawings:—

The same reference letters in the different views indicate the same or similar parts.

Figure 1:
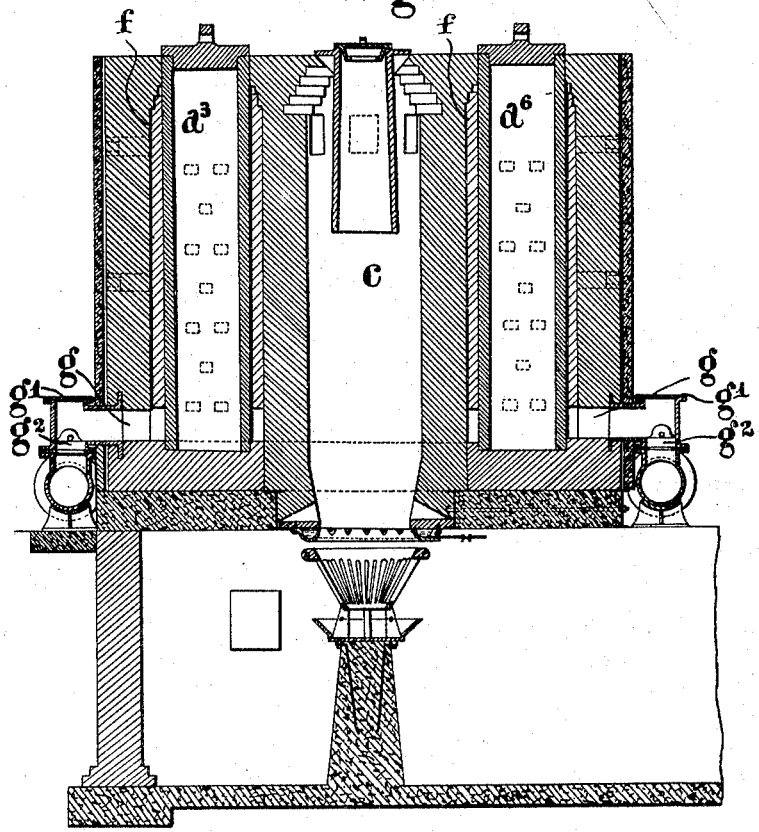
Figure 1 is a sectional elevation and Fig. 2 a half sectional plan, of a muffle furnace constructed in accordance with this invention.
Figure 3:
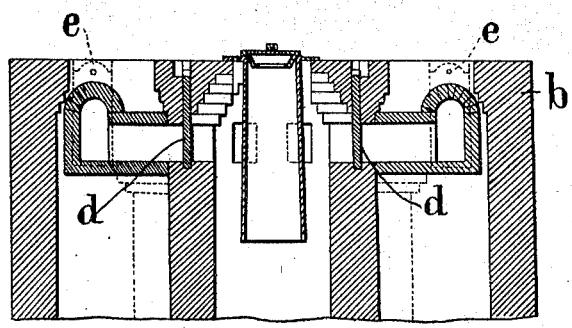
Fig. 3 is a section of the upper part of the furnace on the line A B of Fig. 2.
Figure 2:
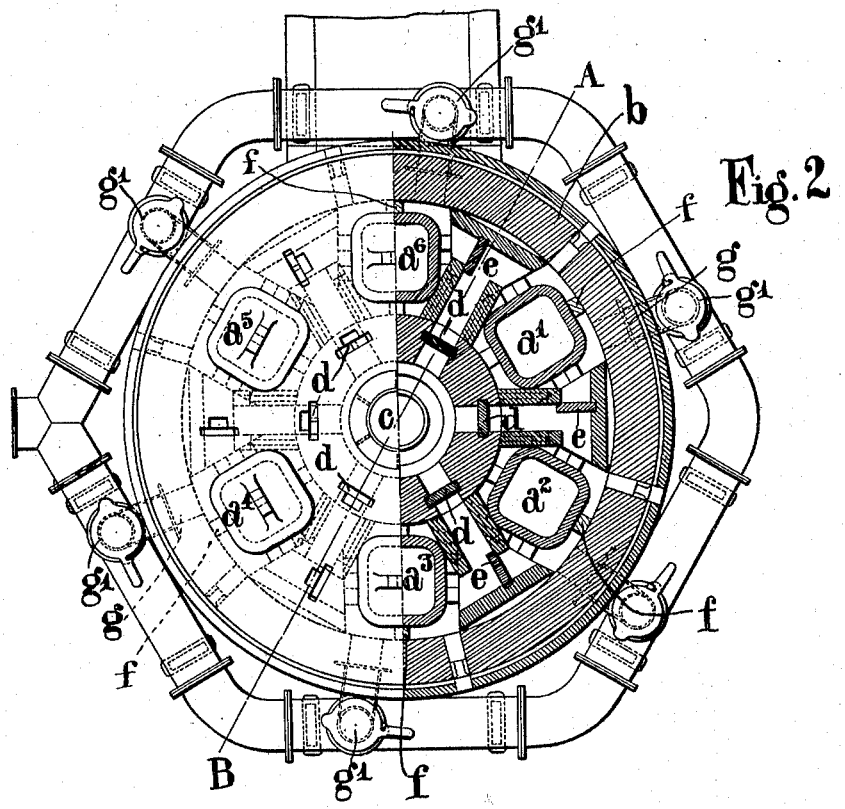

The muffles as $a'$ to $a^6$ may be arranged vertically as shown, or otherwise, the whole series being adapted to form one battery with a continuous circular external wall as $b$. A gas producer $c$ is arranged at the center of the muffle chambers and means are provided for connecting said producer with each muffle chamber. For example, the gas connections may be between the upper portion of the producer and the muffle chambers as shown in Fig. 3, and have suitable valves $d$ therein. A central division wall or baffle $f$ may cause the hot gases to pass down one side of each chamber and up the other side. The external wall of the producer forms the internal wall of the series of muffle chambers. A port $g$ serves both for the admission of air to and the outflow of the waste gases from each chamber, a valve $g'$ controlling the air and a valve $g^2$ the flue connection. The ducts or communications between the respective muffle chambers are controlled by valves as $e$.

If, in a series or battery of six muffles as illustrated, with their respective chambers, the first muffle $a'$ of the series is open for the withdrawal of its contents and for recharging, and the chamber of the fourth muffle $a^4$, is the combustion area, gas and air would be admitted in the required proportion to such fourth chamber, the valves $d$ and $e$ of that chamber being open and the valves $g'$ and $g^2$ closed. Before admission to such chamber the air supply would be caused to pass through the chambers of the second and third muffles, being admitted by the valve $g'$ of the chamber of the muffle $a^2$, and passing through the open valve $e$ of the muffle chamber $a^3$ thence through such chamber $a^3$ and the valve $e$ of the muffle chamber $a^4$ where it meets and supports the combustion of the producer gas coming through the valve $d$ of the said chamber $a^4$.

The hot gaseous products of combustion in passing from the chamber $a^4$ to the flue would flow through the chambers of the muffles $a^5$ and $a^6$ and pass out by the valve $g^2$ of the chamber of the muffle $a^6$.

The valves $d$ of all the chambers but the one containing the muffle $a^4$ will be closed, and all the valves $e$ will be open, except the two in connection with the chamber of the muffle $a'$. After working under such conditions for a given time, depending upon requirements, the valves are adjusted or moved so that the fifth chamber becomes the combustion area, the third and fourth chambers, the air pre-heating areas, and the sixth and first chambers are connected to the flue. The second muffle is then cut out of the series and can be discharged of its contents and re-charged. Each muffle and its chamber is in turn made to serve the respective functions forming the complete cycle.

The various pipe and flue connections can be arranged beneath the floor level or otherwise, and the controlling valves or their equivalent are conveniently disposed for manipulation.

Having now described my invention what I claim as new and desire to secure by Letters Patent is:—

1. In muffle furnaces, the combination with a gas producer, of a series of inter-communicating chambers surrounding said producer, a muffle in each of the said chambers, and means consisting of ducts between the chambers with controlling valves therein whereby each chamber in turn is made to serve as the combustion area and as a regenerative area, as set forth.

2. In muffle furnaces, the combination with a gas producer, of a series of chambers surrounding said producer, ducts putting the said chambers into inter-communication, a valve in each of said ducts, a muffle in each chamber, a duct between each chamber and the producer, a valve in each of said ducts, a port for each chamber serving both for the inflow of air to and the outflow of waste gases from the chamber, and an air control valve and a waste gas control valve for each of said ports, as set forth.

In testimony whereof I have signed my name to this specification.

THOMAS WILLIAM STAINER HUTCHINS.